US008073172B2

(12) United States Patent
Sip

(10) Patent No.: US 8,073,172 B2
(45) Date of Patent: Dec. 6, 2011

(54) SPEAKER AND WIRELESS CHARGING SYSTEM USING SAME

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 390 days.

(21) Appl. No.: 12/494,323

(22) Filed: Jun. 30, 2009

(65) Prior Publication Data

US 2010/0215203 A1    Aug. 26, 2010

(30) Foreign Application Priority Data

Feb. 26, 2009    (CN) .......................... 2009 1 0300571

(51) Int. Cl.
*H04R 25/00*    (2006.01)
(52) U.S. Cl. ........................................ 381/323; 381/386
(58) Field of Classification Search .................. 381/312, 381/316, 322, 323, 331, 386, 395; 320/107, 320/108; 379/52
See application file for complete search history.

(56) References Cited

U.S. PATENT DOCUMENTS

| 4,379,988 A | * | 4/1983 | Mattatall | 320/108 |
| 5,712,919 A | * | 1/1998 | Ruhling | 381/316 |
| 6,661,197 B2 | * | 12/2003 | Zink et al. | 320/108 |

* cited by examiner

*Primary Examiner* — Huyen D Le
(74) *Attorney, Agent, or Firm* — Altis Law Group, Inc.

(57) ABSTRACT

A speaker includes a casing, a sound emitting portion, a conductive coil received in the casing, and a circuit board. The casing includes a side wall. The sound emitting portion received in the casing includes a diaphragm including a first end fixed to the casing and an opposite second end. The conductive coil includes a front end fixed to the side wall, and a rear end fixedly connected to the second end of the diaphragm. The circuit board includes an audio processing module, a charging module and a controlling module. The audio processing module is configured for receiving an audio signal and controlling the conductive coil to vibrate in response to the received audio signal. The charging module is configured for electrifying the conductive coil using alternating current. The controlling unit is configured for selectively connecting the conductive coil to the audio processing module electrically or to the charging module.

16 Claims, 8 Drawing Sheets

US 8,073,172 B2

SPEAKER AND WIRELESS CHARGING SYSTEM USING SAME

BACKGROUND

1. Technical Field

The present disclosure relates to speakers, and particularly, to a speaker and a wireless charging system using the same.

2. Description of Related Art

Most portable electronic devices such as cellular phones, or laptop computers, are powered by rechargeable batteries. To charge the batteries, a charger is connected to a connector on the outer shell of the typical portable electronic device.

Repetitious plugging and unplugging of the charger with the connector of the portable electronic device degrades both the charger and the portable electronic device connector. Therefore, a wireless charging system has been proposed.

Because most of these portable electronic devices are also used to listen to music, an external speaker is typically connected to these electronic devices. Thus, both the charger and the speaker need to be provided to charge and to listen to the audio sounds from the electronic devices. This is an inconvenience.

Therefore, what is needed is to provide a speaker and a wireless charging system using the speaker.

DETAILED DESCRIPTION

Figure 1:
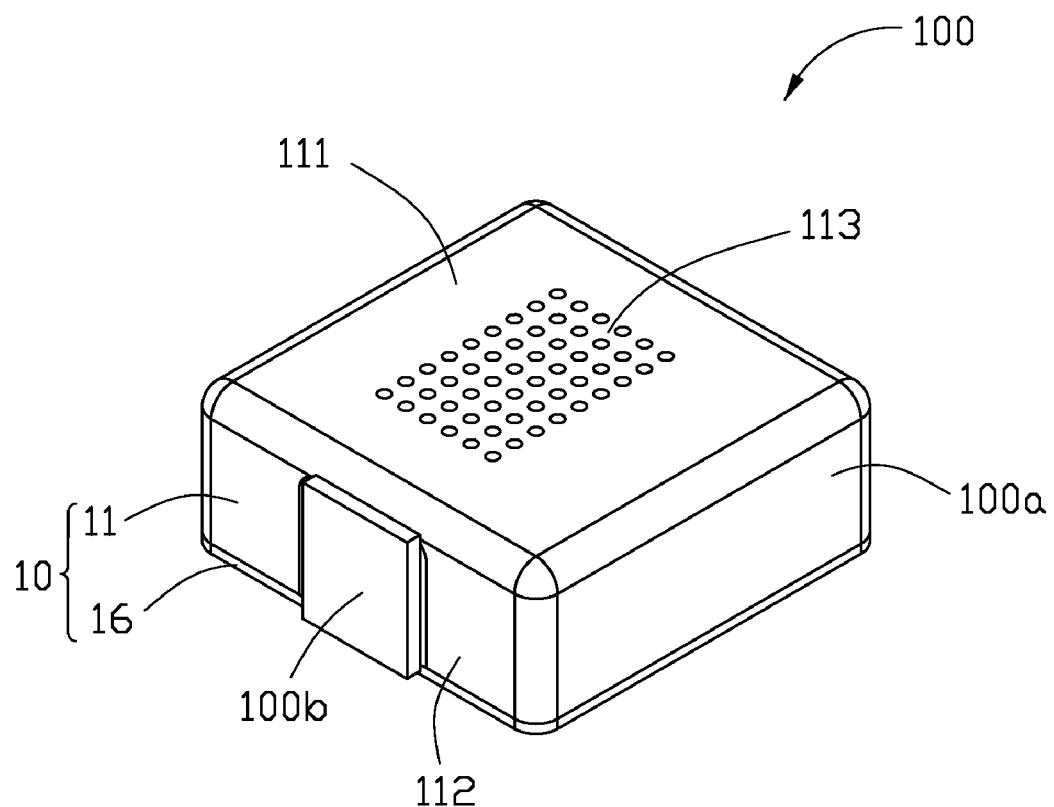
FIG. 1 is a schematic isometric view of a wireless charging system including a speaker and an electronic device, according to an exemplary embodiment.
Figure 2:
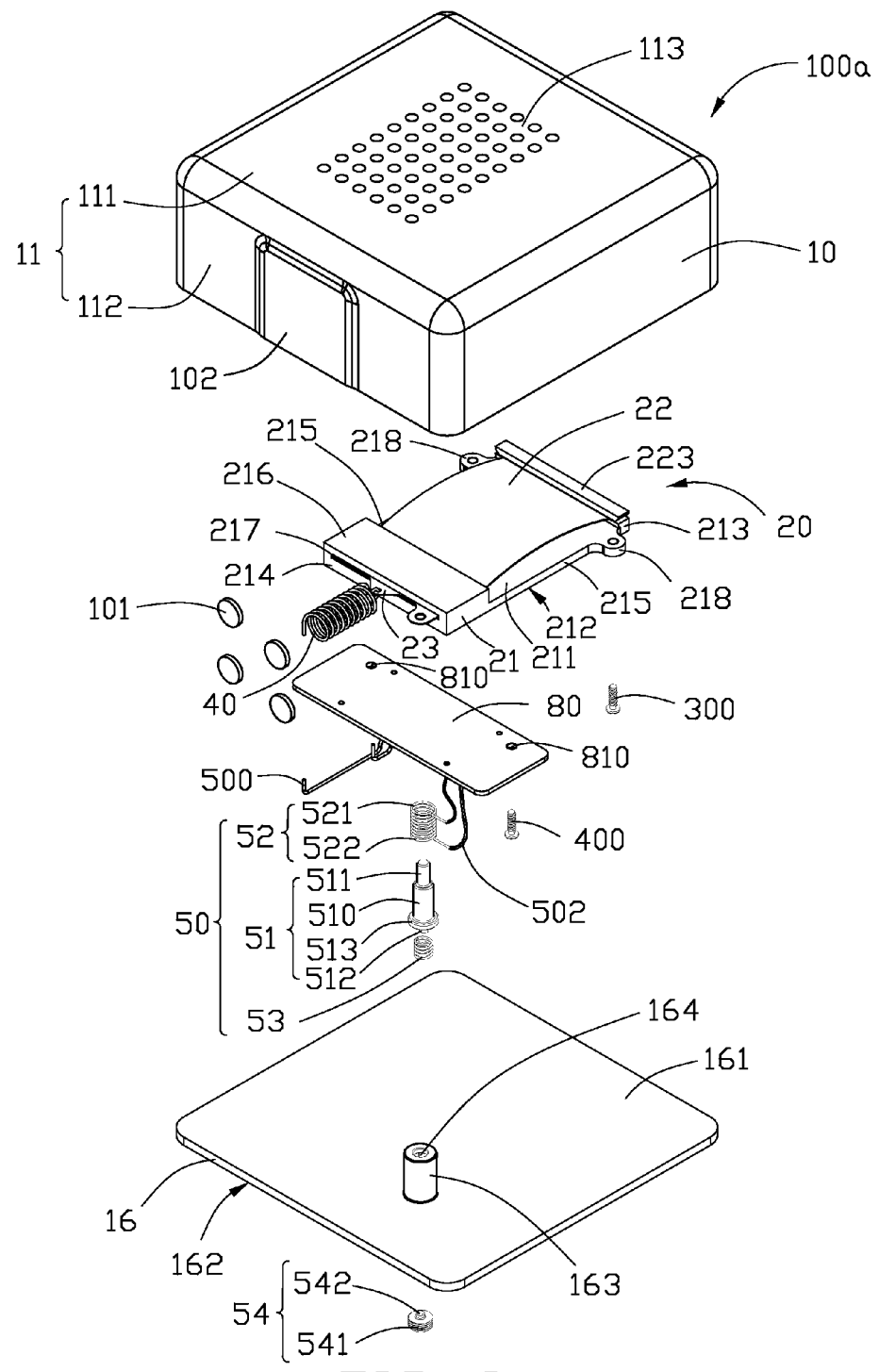
FIG. 2 is a partially disassembled isometric view of the speaker of FIG. 1.

Referring to FIGS. 1 and 2, a wireless charging system 100, according to an exemplary embodiment, includes a speaker 100a and an electronic device 100b. The speaker 100a includes a casing 10, a sound emitting portion 20, a first conductive coil 40, a stopping portion 50, and a circuit board 80 received in the casing 10.

Figure 3:
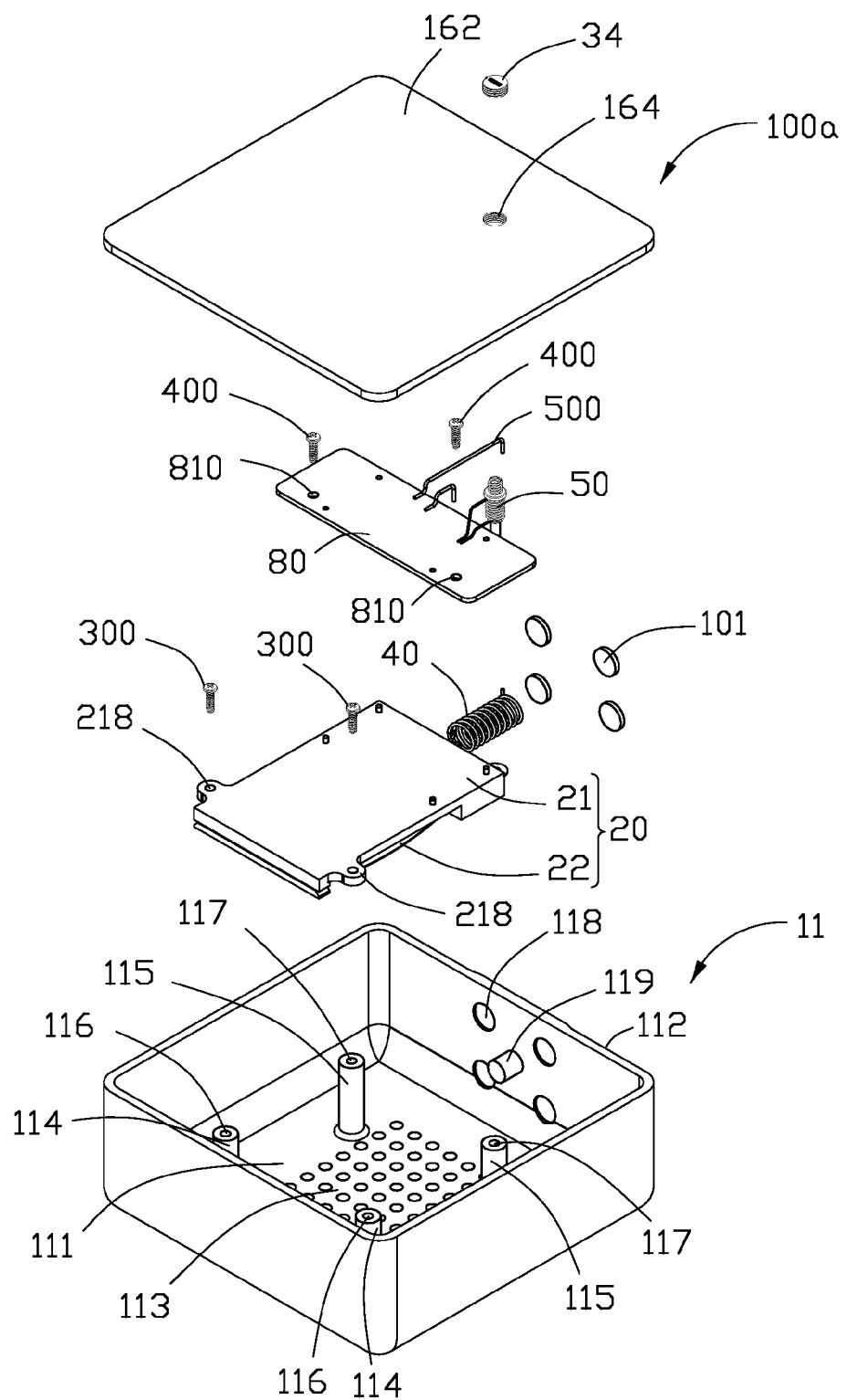
FIG. 3 is similar to FIG. 2, but viewed from another angle.

The casing 10 includes an upper cover 11 and a lower cover 16. The upper cover 11 includes an upper wall 111 and four side walls 112 approximately perpendicular to the upper wall 111. A plurality of through holes 113 are defined in the upper wall 111. Referring to FIG. 3, two first screw holders 114 and two second screw holders 115 are formed on an inner surface of the upper wall 111. A first threaded hole 116 is defined in each first screw holder 114 and a second threaded hole 117 is defined in each second screw holder 115. Numerous circular recesses 118 are defined in an inner surface of one side wall 112 and a positioning pole 119 extends from the inner surface of the side wall 112 where the recesses 118 are defined. The speaker 100a further includes numerous circular permanent magnets 101, each fixed inside one recess 118. The electronic device 100b is attached to the side wall 112 opposite to the permanent magnets 101 via an attraction of the permanent magnets 101. The positioning pole 119 is surrounded by the numerous permanent magnets 101. A rectangular supporting portion 102 for supporting the electronic device 100b protrudes from an outer surface of the side wall 112 and corresponds to the permanent magnets 101.

Figure 4:
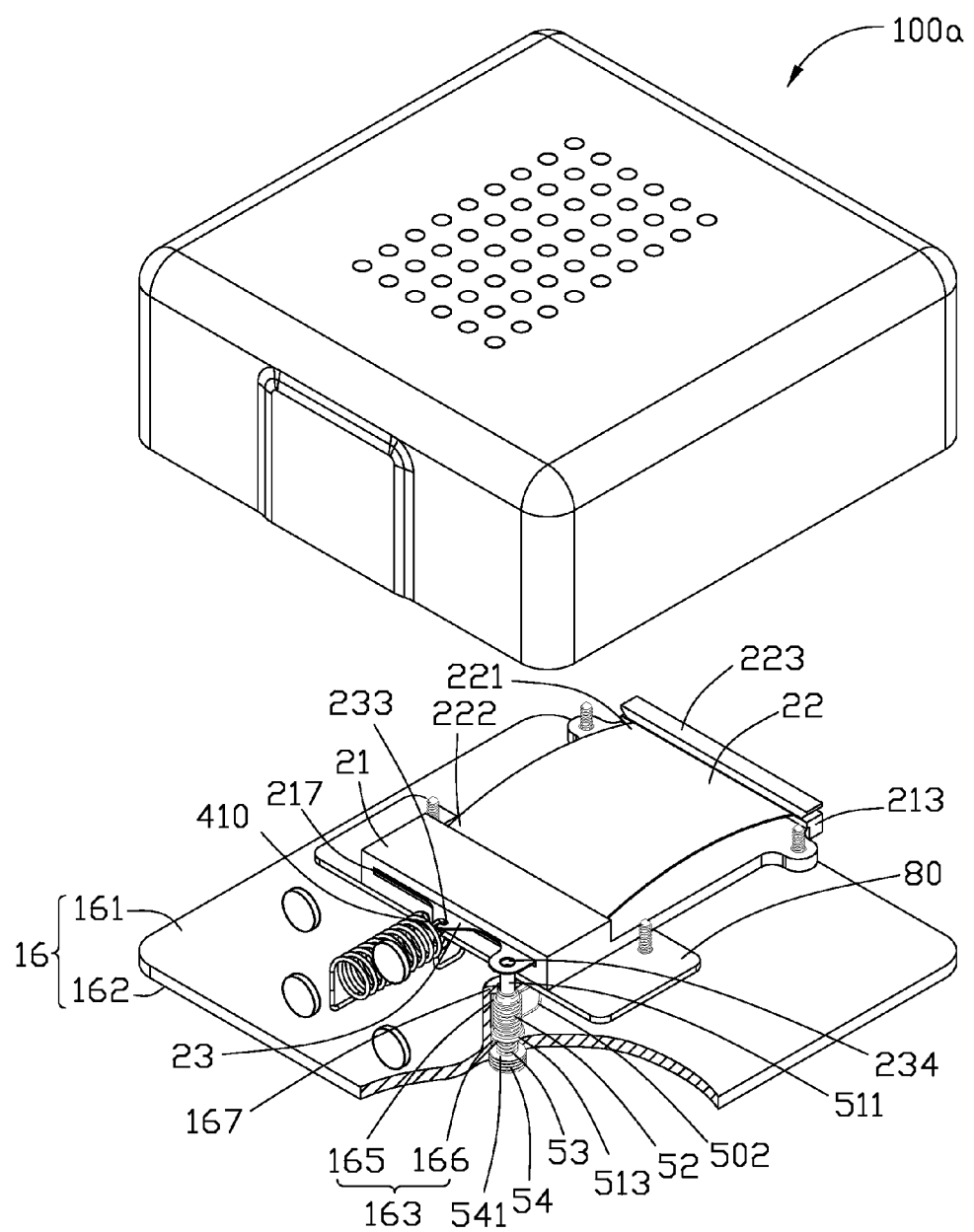
FIG. 4 is a cut-away and partially assembled isometric view of the speaker of FIG. 2, showing the speaker in a work state.

Referring to FIG. 4 together with FIG. 2, the lower cover 16 is approximately planar-shaped. The lower cover 16 includes an inner surface 161 and an outer surface 162. A hollow receiving pole 163 extends perpendicularly from the inner surface 161 towards the upper wall 111. A through hole 164 is defined through the receiving pole 163, the inner surface 161, and the outer surface 162. The receiving pole 163 includes a distal end 165 and a root end 166 on another side of the receiving pole 163 opposite to the distal end 165. The distal end 165 forms an inner flange portion 167 in the through hole 164. The root end 166 forms inner threads (not shown) in the through hole 164.

The sound emitting portion 20 includes a supporting plate 21, a diaphragm 22, and a connecting plate 23. The supporting plate 21 includes an upper surface 211, a lower surface 212, a first side 213, a second side 214 opposite to the first side 213, and two opposite parallel third sides 215. The first side 213, the second side 214 and the third sides 215 connect the upper surface 211 to the lower surface 212. A protrusion 216 is formed on the upper surface 211 along the second side 214. An elongated through hole 217 is defined through the protrusion 216 along the third sides 215. Two fixing tabs 218 extend from the two third sides 215 with a direction perpendicular to the third sides 215, each corresponding to one first screw holder 114. A bolt 300 extends through one fixing tab 218 and is screwed in the corresponding first screw holder 114 through the first threaded hole 116 so that the supporting plate 21 is fixed to the upper cover 11.

The diaphragm 22 is arc-shaped and includes a first end 221 and a second end 222 opposite to the first end 221. The first end 221 is fixed to the first side 213 of the supporting plate 21 by a fastener 223. The second end 222 is received in the elongated through hole 217 and is connected to the connecting plate 23. The second end 222 moves together with the connecting plate 23.

The connecting plate 23 partially protrudes from the elongated through hole 217. A first positioning through hole 233 and a second positioning through hole 234 are defined in a portion of the connecting plate 23. The portion of the connecting plate 23 with the through holes 233, 234 protrudes from the elongated through hole 217. The first positioning through hole 233 corresponds to the positioning pole 119. The second positioning through hole 234 is aligned with the through pole 164.

Figure 6:
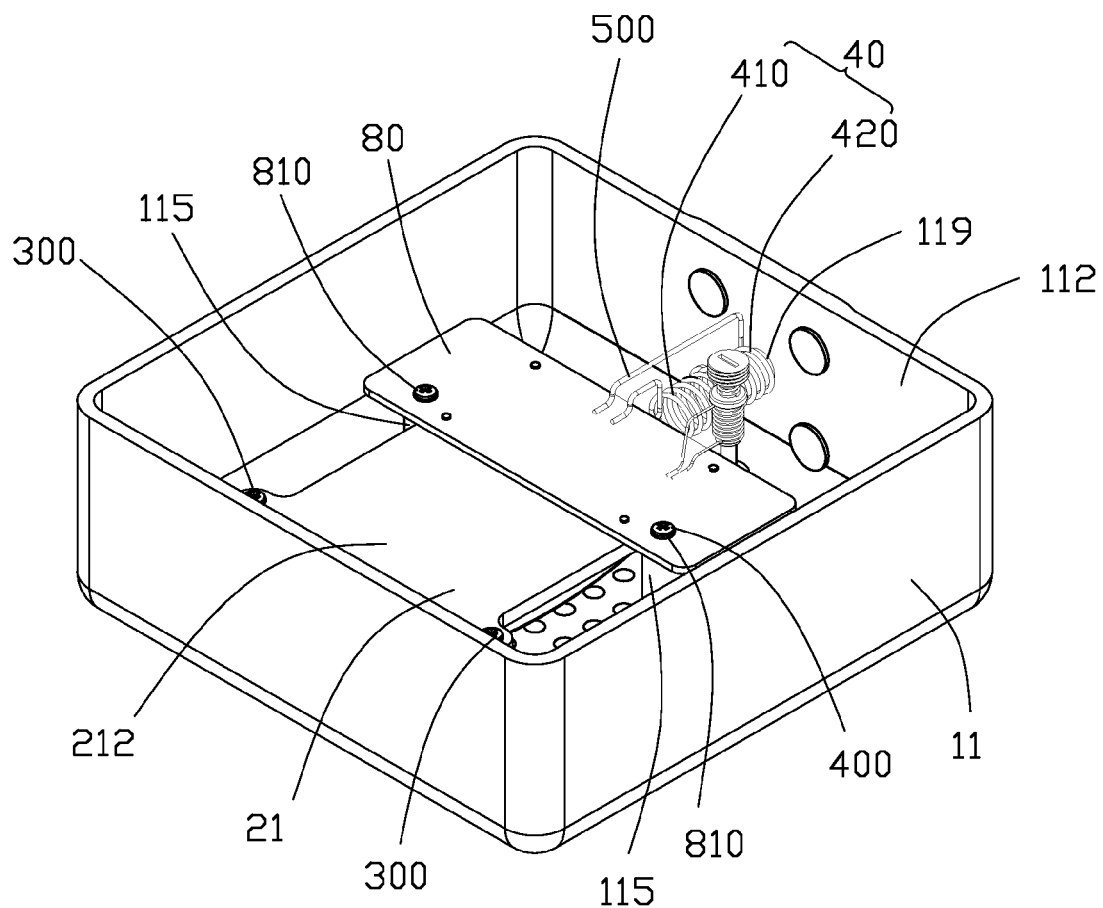
FIG. 6 is a partially assembled isometric view of the speaker of FIG. 3.

The first conductive coil 40 may be a compression coil spring and may be made from copper. The first conductive coil 40 includes a front end 420 and a rear end 410, as shown in FIG. 6. The front end 420 is fixed to the positioning pole 119, and the rear end 410 is fixedly coupled to the connecting plate 23 through the first positioning through hole 233 (see FIG. 4). The front end 420 and the rear end 410 are electrically connected to the circuit board 80 via cables 500.

The stopping portion 50 is moveably received in the through hole 164. The stopping portion 50 includes a rod 51, a first spring 52, a second spring 53, and a fixing member 54. The first spring 52 and the second spring 53 are compressed in the through hole 164.

The rod 51 is moveably received in the through hole 164 and includes a body 510, a first fixing portion 511, a second fixing portion 512, and an outer flange portion 513. The first fixing portion 511 and the second fixing portion 512 extend from opposite ends of the body 510 along an axial direction of the body 510. The outer flange portion 513 extends from one end of the body 510 where the second fixed portion 512 extends, along a radial direction of the body 510 away from the body 510.

The first spring 52 is conductive and is sleeved on the body 510 of the rod 51. The first spring 52 includes a first end 521 and a second end 522. The first end 521 abuts against the inner flange portion 167 in the through hole 164. The second end 522 is fixed to the outer flange portion 513. The first spring 52 is electrically connected to the circuit board 80 via cables 502.

The fixing member 54 is screwed into the through hole 164 from the outer surface 162 of the lower cover 16 so that the fixing member 54 is fixed to the root end 166 of the receiving pole 163. The fixing member 54 includes a base 541 and a fixing pole 542 extending from the base 541. Outer threads (not label) are formed around the base 541 to engage with the inner threads at the root end 166 of the receiving pole 163 in the through hole 164.

The second spring 53 is sleeved on the second fixing portion 512 and the fixing pole 542 so that the second spring 53 abuts against the outer flange portion 513 of the rod 51 and the base 541 of the fixing member 54.

Figure 5:
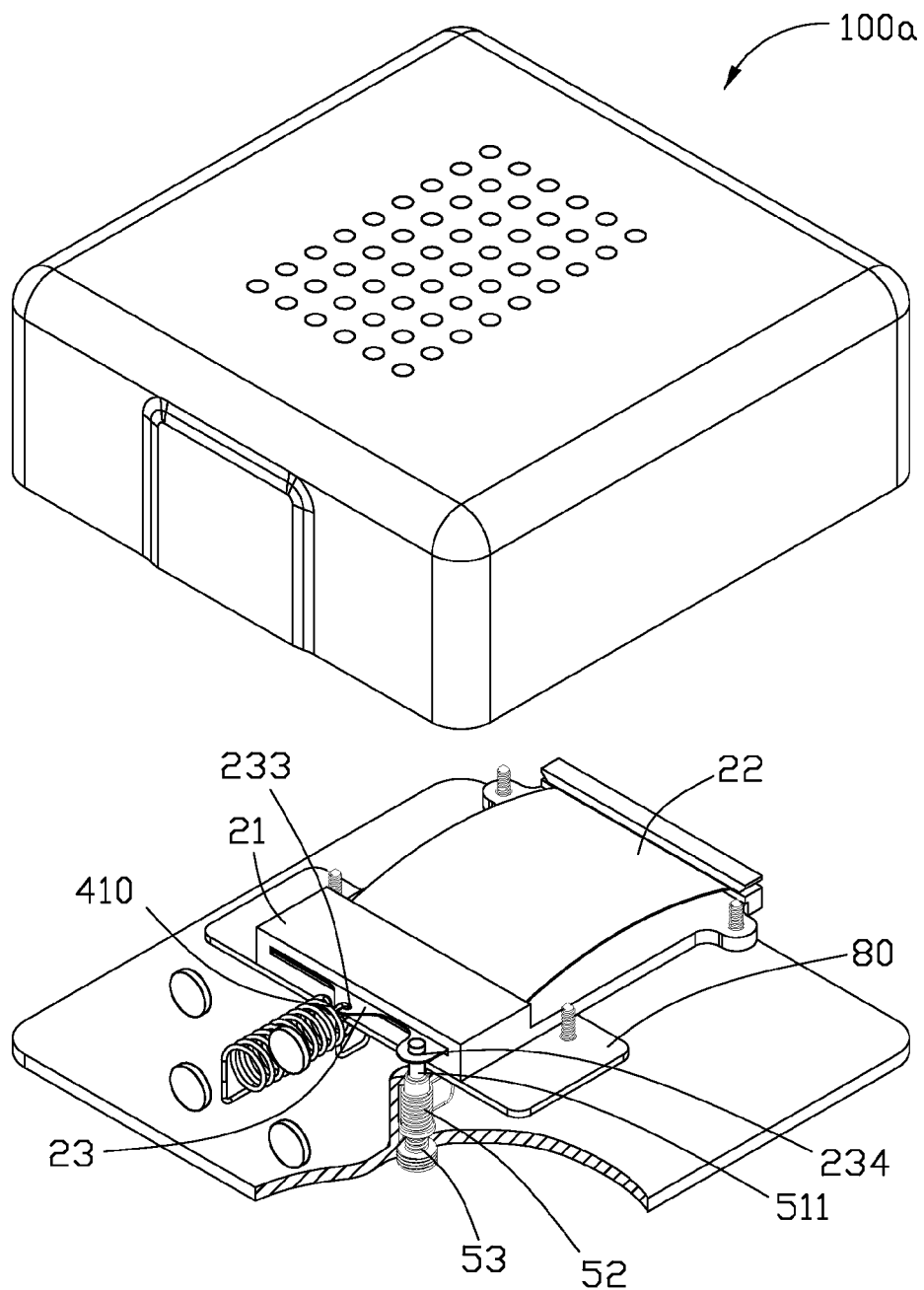
FIG. 5 is similar to FIG. 4, but showing the speaker in another work state.

When the first spring 52 is not electrified by the circuit board 80, a restoring force of the first spring 52 is greater than or equal to that of the second spring 53. Therefore, the first fixing portion 511 of the rod 51 is separated from the connecting plate 23. When the first spring 52 is electrified by the circuit board 80, the first spring 52 is further compressed by inter-attraction of turns of the first spring 52. The second spring 53 returns to normal, thereby pushing the rod 51 toward the connecting plate 23. Therefore, the first fixing portion 511 extends through the second positioning through hole 234 (see FIG. 5) so that movement of the connecting plate 23 is stopped by the rod 51.

The circuit board 80 is positioned on the lower surface 212 of the supporting plate 21 via hot melted adhesive (not shown). Two through holes 810 are defined through the circuit board 80, corresponding to the two second screw holders 115. A bolt 400 extends through one through hole 810 and is screwed in the corresponding second screw holder 115 through the second threaded hole 117 so that the circuit board 80 is fixed to the upper cover 11.

Figure 7:
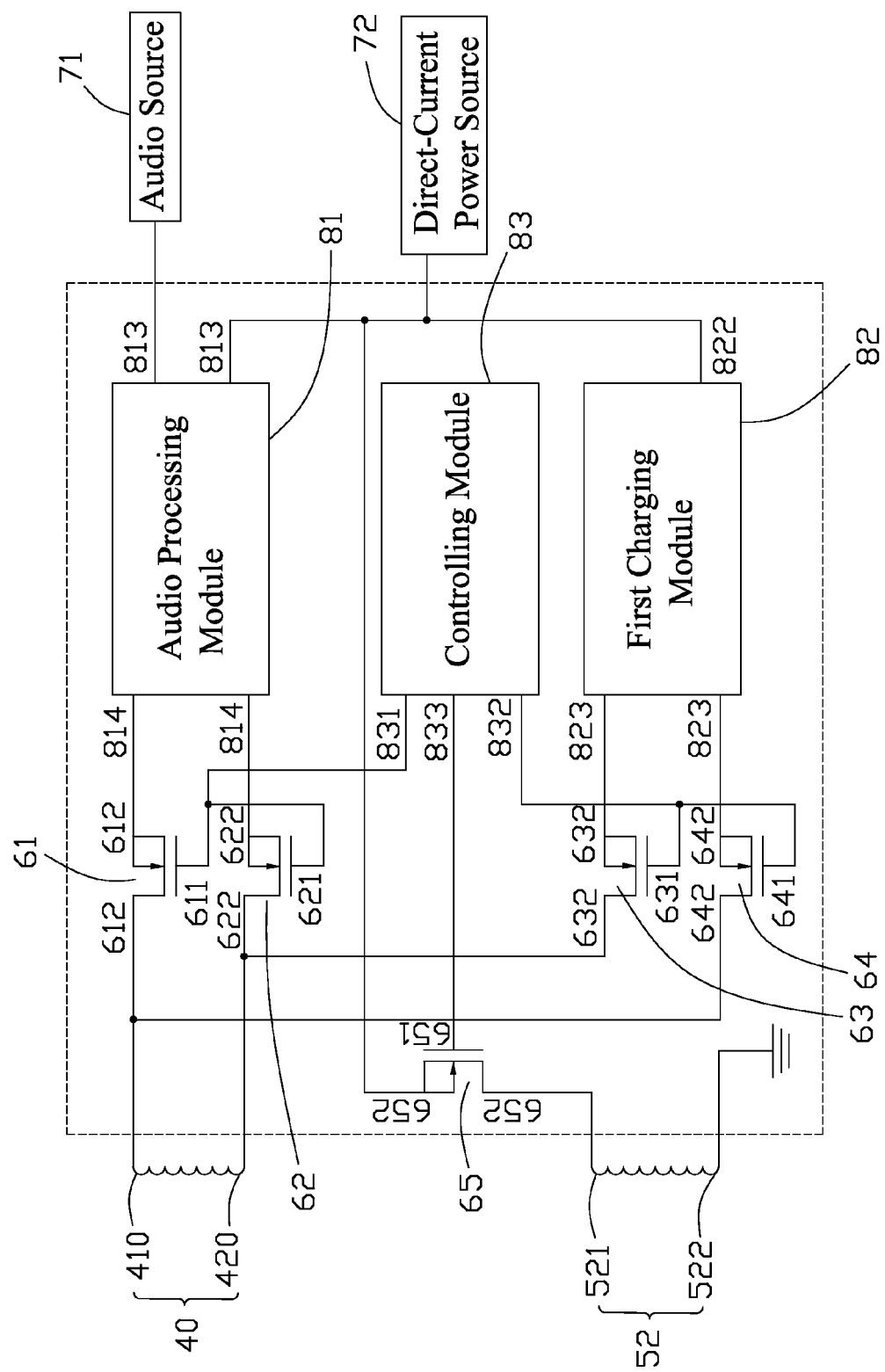
FIG. 7 is a circuit diagram of a circuit board of the speaker of FIG. 1.

Referring to FIG. 7, the circuit board 80 includes an audio processing module 81, a first charging module 82, a controlling module 83, a first switch 61, a second switch 62, a third switch 63, a fourth switch 64 and a fifth switch 65.

The audio processing module 81 is configured for receiving an audio signal and controlling the first conductive coil 40 to vibrate in response to the audio signal. The audio processing module 81 may be powered by a direct-current power source 72. The audio source 71 may be a personal computer or the electronic device 100b and the direct-current power source 72 may be a battery positioned in the speaker 100 or an external battery. The audio processing module 81 further includes two first input terminals 813 and two first output terminals 814. The audio source 71 is connected to the audio processing module 81 via one first input terminal 813, and the direct-current power source 72 is connected to the audio processing module 81 via the other first input terminal 813.

The first charging module 82 is configured for converting the direct current from the direct-current power source 72 into alternating current. The first charging module 82 further includes a second input terminal 822 and two second output terminals 823. The first charging module 82 is electrically connected to the direct-current power source 72 via the second input terminal 822.

The controlling module 83 is configured for selectively connecting the conductive coil 40 to the audio processing module 81 electrically or to the first charging module 82. The controlling module 83 is further configured for selectively applying the direct-current power source 72 to the first spring 52. The controlling module 83 further includes a first signal terminal 831, a second signal terminal 832 and a third signal terminal 833.

The first switch 61 includes a first control terminal 611 and two first connecting terminals 612. One first connecting terminal 612 is electrically connected to one first output terminal 814, and the other first connecting terminal 612 is electrically connected to the rear end 410 of the first conductive coil 40.

The second switch 62 includes a second control terminal 621 and two second connecting terminals 622. One second connecting terminal 622 is electrically connected to the other first output terminal 814, and the other second connecting terminal 622 is electrically connected to the front end 420 of the first conductive coil 40. The second control terminal 621 is electrically connected to the first control terminal 611, and are together electrically connected to the first signal terminal 831 of the controlling module 83.

The third switch 63 includes a third control terminal 631 and two third connecting terminals 632. One third connecting terminal 632 is electrically connected to one second output terminal 823 of the first charging module 82, and the other third connecting terminal 632 is electrically connected to the front end 420 of the first conductive coil 40.

The fourth switch 64 includes a fourth control terminal 641 and two fourth connecting terminals 642. One fourth connecting terminal 642 is electrically connected to the other second output terminal 823 of the first charging module 82. The other fourth connecting terminal 642 is electrically connected to the rear end 410 of the first conductive coil 40. The fourth control terminal 641 is electrically connected to the third control terminal 631, and are together electrically connected to the second signal terminal 832 of the controlling module 83.

The fifth switch 65 includes a fifth control terminal 651 and two fifth connecting terminals 652. One fifth connecting terminal 652 is electrically connected to the direct-current power source 72, and the other fifth connecting terminal 652 is electrically connected to the first end 521 of the first spring 52. The fifth control terminal 651 is electrically connected to the third signal terminal 833 of the controlling module 83. The second end 522 of the first spring 52 is grounded.

When the first signal terminal 831 of the controlling module 83 is at high level, and the second signal terminal 832 and the third signal terminal 833 are at low level, the first switch 61 and the second switch 62 are switched on, and the third switch 63, the fourth switch 64 and the fifth switch 65 are switched off. Therefore, the controlling module 83 electrically connects the first conductive coil 40 to the audio processing module 81. The direct-current power source 72 is not applied by the controlling module 83 to the first spring 52.

When the first signal terminal 831 is at low level, and the second signal terminal 832 and the third signal terminal 833 are at high level, the first switch 61 and the second switch 62 are switched off, and the third switch 63, the fourth switch 64 and the fifth switch 65 are switched on. Therefore, the controlling module 83 controls the first conductive coil 40 to be electrically connected to the first charging module 82. The first spring 52 is electrified by the controlling module 83 using the direct-current power source 72 so that the first spring 52 is further compressed by the inter-attraction of turns of the first spring 52.

Figure 8:
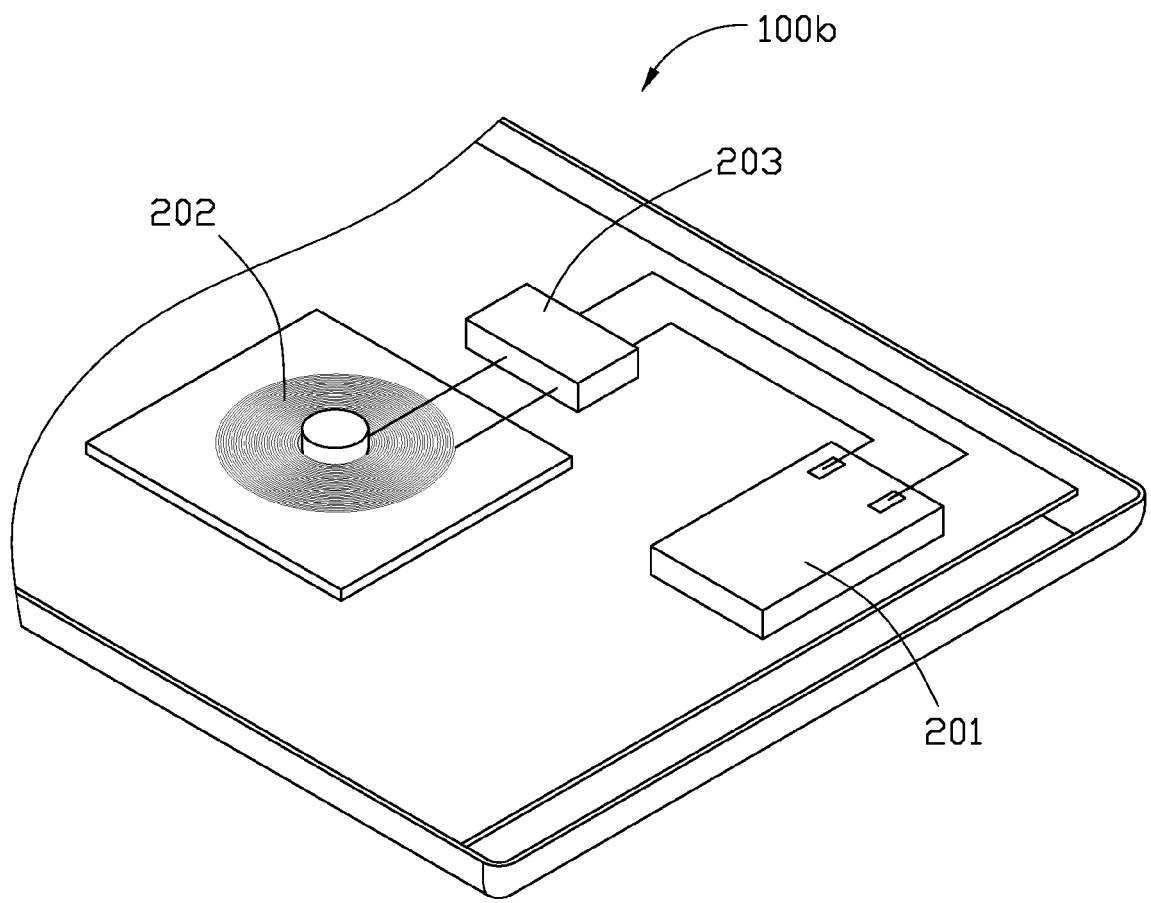
FIG. 8 is a partially schematic isometric view of the electronic device of FIG. 1.

Referring to FIG. 8, the electronic device 100*b* includes a rechargeable battery 201, a second conductive coil 202, and a second charging module 203. The second conductive coil 202 is magnetically coupled to the first conductive coil 40. The rechargeable battery 201 and the second conductive coil 202 are electrically connected to the second charging module 203. The second charging module 203 is configured for charging the rechargeable battery 201 using current induced in the second conductive coil 202.

A brief description of working of the charging device 100 follows:

When the controlling module 83 controls the first conductive coil 40 to be electrically connected to the audio processing module 81 and the first spring 52 is not electrified by the controlling module 83, the restoring force of the first spring 52 is greater than or equal to that of the second spring 53. Therefore, the first fixing portion 511 of the rod 51 is separated from the connecting plate 23. The audio processing module 81 controls the first conductive coil 40 to vibrate. Therefore, the first conductive coil 40 moves back and forth, reverberating the diaphragm 22 via the connecting plate 23. As a result, sound is emitted by the vibration of the diaphragm 22.

When the controlling module 83 controls the first conductive coil 40 to be electrically connected to the first charging module 82 and the first spring 52 is electrified by the controlling unit 83 using the direct-current power source 72, the first spring 52 is further compressed so that the second spring 53 is restored to move the rod 51 toward the connecting plate 23. As a result, the first fixing portion 511 extends through the second positioning through hole 234 so that movement of the connecting plate 23 is stopped by the rod 51. The alternating current output from the first charging module 82 goes through the first conductive coil 40. If the electronic device 100*b* is attached to the supporting portion 102, an induced current is generated in the second conductive coil 202 by the first conductive coil 40. Therefore, the rechargeable battery 201 is charged by the second charging module 203 using current induced in the second conductive coil 202. Therefore, the speaker 100*a* is integrated with a charging function for charging the electronic device 100*b*, which results in convenience.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A speaker, comprising:
a casing comprising a side wall;
a sound emitting portion received in the casing, and comprising a diaphragm, the diaphragm comprising a first end fixed to the casing and an opposite second end;
a conductive coil received in the casing, and comprising a front end and a rear end, the front end fixed to the side wall, the rear end fixedly connected to the second end of the diaphragm; and
a circuit board comprising an audio processing module, a charging module and a controlling module, the audio processing module configured for receiving an audio signal and controlling the conductive coil to vibrate in response to the received audio signal, the charging module configured for electrifying the conductive coil using alternating current, the controlling unit configured for selectively connecting the conductive coil to the audio processing module electrically or to the charging module.

2. The speaker as claimed in claim 1, wherein the side wall comprises a positioning pole extending therefrom, and the front end of the conductive coil is fixed to the positioning pole.

3. The speaker as claimed in claim 2, wherein a plurality of circular recesses are defined in an inner surface of the side wall, and a plurality of permanent magnets are fixed inside the plurality of circular recesses respectively, the positioning pole surrounded by the plurality of permanent magnets.

4. The speaker as claimed in claim 1, wherein the casing further comprises an upper wall approximately perpendicular to the side wall, and a plurality of through holes are defined in the upper wall.

5. The speaker as claimed in claim 1, wherein the casing further comprises a lower cover approximately perpendicular to the side wall, the lower cover comprising an inner surface and an outer surface, a hollow receiving pole extending perpendicularly from the inner surface, a through hole defined through the receiving pole, the inner surface and the outer surface, the receiving pole comprising a distal end and an opposite root end, wherein the distal end forms an inner flange portion in the through hole, and the root end forms inner threads in the through hole.

6. The speaker as claimed in claim 5, further comprising a connecting plate, the connecting plate connecting the second end of the diaphragm to the rear end of the conductive coil.

7. The speaker as claimed in claim 6, further comprising a stopping portion moveably received in the through hole, a positioning through hole defined in the connecting plate and aligned with the through hole.

8. The speaker as claimed in claim 1, wherein the sound emitting portion comprises a supporting plate, the supporting plate comprising a first side, and a second side opposite to the first side, a protrusion formed along the second side, an elongated through hole defined through the protrusion, the second end of the diaphragm received in the elongated through hole, the first end of the diaphragm fixed to the first side.

9. A wireless charging system, comprising
a speaker, comprising:
a casing comprising a side wall;
a sound emitting portion received in the casing, and comprising a diaphragm, the diaphragm comprising a first end fixed to the casing and an opposite second end;
a first conductive coil received in the casing, and comprising a front end and a rear end, the front end fixed to the side wall, the rear end fixedly connected to the second end of the diaphragm; and
a circuit board comprising an audio processing module, a first charging module and a controlling module, the audio processing module configured for receiving an audio signal and controlling the first conductive coil to vibrate in response to the received audio signal, the first charging module configured for electrifying the first conductive coil using alternating current, the controlling unit configured for selectively connecting the first conductive coil to the audio processing module electrically or to the first charging module; and
an electronic device attached to the side wall, the electronic device comprising a rechargeable battery, a second conductive coil and a second charging module, the second conductive coil magnetically coupled to the first conductive coil, the second charging module configured for charging the rechargeable battery using current induced in the second conductive coil by the first conductive coil.

10. The wireless charging system as claimed in claim 9, wherein the side wall comprises a positioning pole extending therefrom, and the front end of the first conductive coil is fixed to the positioning pole.

11. The wireless charging system as claimed in claim 10, wherein a plurality of circular recesses are defined in an inner surface of the side wall, and a plurality of permanent magnets are fixed inside the plurality of circular recesses respectively, the positioning pole surrounded by the plurality of permanent magnets.

12. The wireless charging system as claimed in claim 9, wherein the casing further comprises an upper wall approximately perpendicular to the side wall, and a plurality of through hole is defined in the upper wall.

13. The wireless charging system as claimed in claim 9, wherein the casing further comprises a lower cover approximately perpendicular to the side wall, the lower cover comprising an inner surface and an outer surface, a hollow receiving pole extending perpendicularly from the inner surface, a through hole defined through the receiving pole, the inner surface and the outer surface, the receiving pole comprising a distal end and an opposite root end, wherein at the distal end, an inner flange portion is formed in the through hole, and at the root end, inner threads are formed around the through hole.

14. The wireless charging system as claimed in claim 13, further comprising a connecting plate, the connecting plate connecting the second end of the diaphragm to the rear end of the first conductive coil.

15. The wireless charging system as claimed in claim 14, further comprising a stopping portion moveably received in the through hole, a positioning through hole defined in the connecting plate and aligned with the through hole.

16. The wireless charging system as claimed in claim 9, wherein the sound emitting portion comprises a supporting plate, the supporting plate comprising a first side, and a second side opposite to the first side, a protrusion formed along the second side, an elongated through hole defined through the protrusion, the second end of the diaphragm received in the elongated through hole, the first end of the diaphragm fixed to the first side.

* * * * *